Oct. 9, 1956  E. J. POLTORAK  2,766,055
GASKETS
Filed Dec. 30, 1952  2 Sheets-Sheet 1

INVENTOR.
EMIL J. POLTORAK
BY Virgil C. Klin
ATTORNEYS.

Oct. 9, 1956   E. J. POLTORAK   2,766,055
GASKETS
Filed Dec. 30, 1952   2 Sheets-Sheet 2
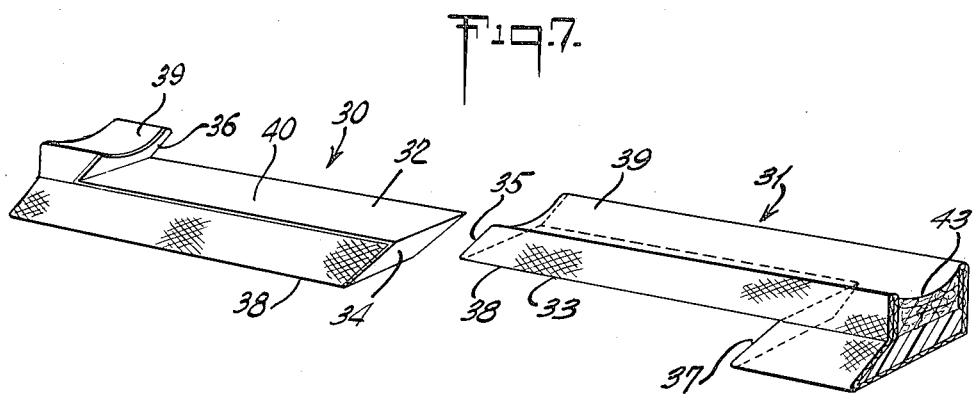
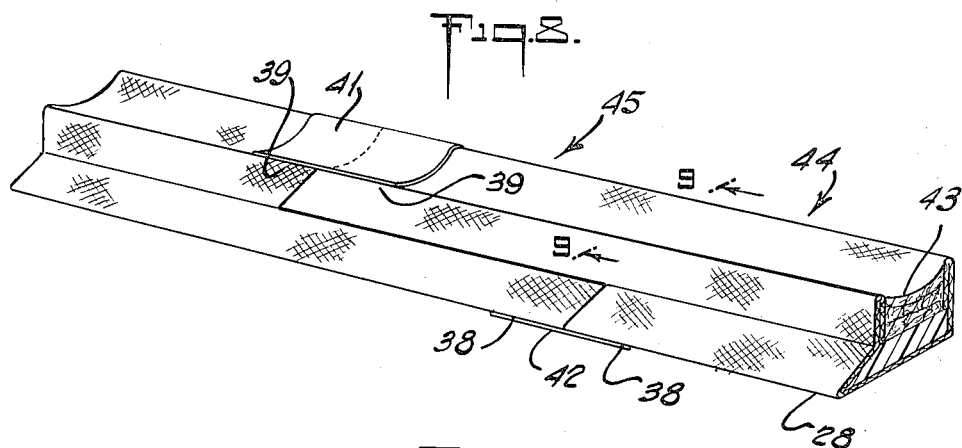
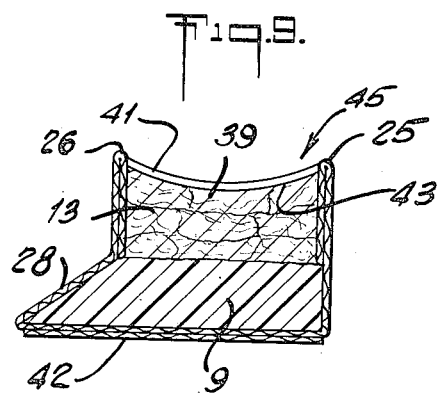
INVENTOR
EMIL J. POLTORAK.
BY Virgil C Kline
ATTORNEY

United States Patent Office 2,766,055
Patented Oct. 9, 1956

2,766,055

GASKETS

Emil J. Poltorak, Somerville, N. J., assignor to Johns-Manville Corporation, New York, N. Y., a corporation of New York Application December 30, 1952, Serial No. 328,652

5 Claims. (Cl. 288—23)

This invention relates to gaskets, and more particularly to molded, vulcanized gaskets having particular utility as sealing strips in applications where high temperature is involved, but also having utility as a seal against many solvents, water, certain gases, etc.

One object of the invention is to provide a molded and vulcanized laminated gasket that is strong, tough, durable, heat-resistant, delamination resistant, and having increased and longer lasting resilience in service.

It has been particularly difficult to achieve the aforementioned properties, and especially good delamination resistance, at one or more of the sealing portions or lips of prior gaskets of this general type in which the sealing portions or lips are of laminated construction. It is accordingly a specific object of the invention to overcome this difficulty.

Other objects of my invention will become apparent from the following detailed description, taken in conjunction with the accompanying drawings forming a part of the specification and in which:

Fig. 5 is a top plan view of a gasket strip as shown in Fig. 4, in which the ends of the strip have been joined to form a door gasket for a steam autoclave, or the like;

Fig. 7 is a perspective view of the ends of a gasket strip as shown in Fig. 4, prepared for joining to form a gasket having a joint as illustrated in Fig. 5 and in greater detail in Figs. 8 and 9;

Fig. 8 is an enlarged perspective view showing in detail the joint illustrated in Fig. 5 and formed by joining the ends of the strip gasket illustrated in Fig. 7; and, Fig. 9 is a cross-sectional view of the joint taken on the line 9—9 in Fig. 8, looking in the direction of the arrows.

The gaskets of the instant invention are particularly adapted for service as seals for the doors of steam autoclaves or in other applications where high temperatures are involved, though it is to be understood that such gaskets would also have utility as a seal against various solvents, water, and certain gases, as well as in other applications requiring a seal of more general utility. Gaskets having the properties required for such service have been made from layers of fabric coated with a vulcanizable compound and arranged in laminations in various ways and then vulcanized. Gaskets so made have been found objectionable in that they tend to delaminate too readily in service and are lacking both in sufficient initial resilience and in ability to retain resilience through a long period of service. The instant invention represents an improvement in such gaskets and in the method of making them. A description of the method will serve to a large extent to explain the novel features of my improved gaskets.

Figure 1:
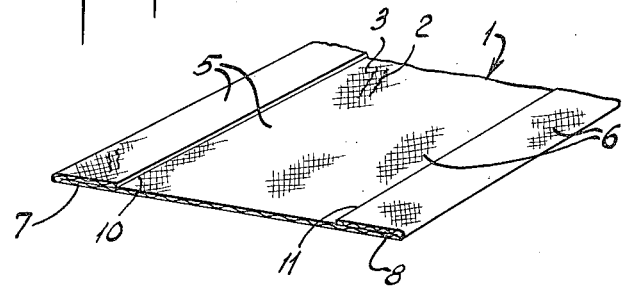
Fig. 1 is a perspective view, partly in section, of a strip of coated wire-inserted asbestos gasket cover material having its lateral edge portions folded back upon themselves, part of the coating being broken away to illustrate the wire reinforcement.
Figure 2:
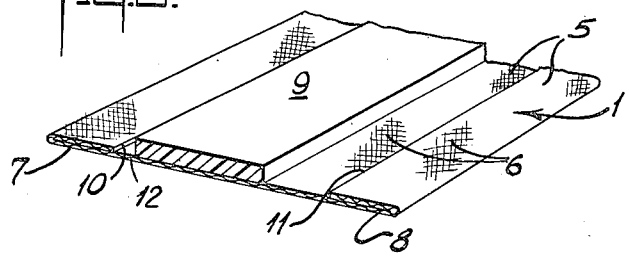
Fig. 2 is a view similar to Fig. 1, but showing further a strip of a vulcanizable, resilient, heat-resistant compound in position on the gasket cover at an intermediate stage in the manufacture of the gasket.
Figure 6:
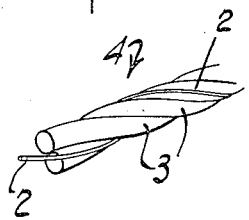
Fig. 6 is an enlarged showing of a wire reinforced asbestos yarn of the type woven together to produce the gasket cover shown in Fig. 1.

I have devised a very simple method for making my novel gaskets. In practicing the method, I employ an asbestos or other heat-resistant fabric possessing the requisite strength with or without wire inserts, but preferably wire inserted, as a jacket or covering material. A conventional wire inserted fabric, of the type shown generally in strip form at 1 in Fig. 1, is suitable. In the fabric illustrated, a wire strand 2 is twisted together with two asbestos strands 3 (Fig. 6) to form yarns 4 which are woven together to produce the wire inserted fabric. Such a fabric is calender-coated with a vulcanizable heat-resistant rubber compound illustrated at 5 containing a vulcanizing agent and filler material and an elastomer, which may be natural rubber, but is preferably one of the synthetic rubbers, such as "Neoprene," butadiene acrylonitrile, butadiene styrene, or silicones. "Neoprene" is presently preferred. A fabric treated as described is preferably bias-cut as exemplified at 6 in Figs. 1 and 2 to the desired width and then joined, if necessary, to achieve the desired length. The bias-cut strips are joined by applying a vulcanizable heat-resistant adhesive rubber compound, preferably of the type identified above as employed in coating the fabric, and then overlapping the ends to a slight extent, as about ¼ inch, after which the overlapped portions are hammered together. The longitudinal edges of the fabric strip so treated and formed are next folded upwardly and back upon themselves to form double-thickness edge portions 7 and 8 of equal width. A strip or block 9 of a vulcanizable heat-resistant rubber compound of the type described above as employed for the coating on the asbestos fabric is laid longitudinally of the fabric strip between the opposed inturned edges of the fabric strip, leaving suitable spaces of predetermined extent between the edges of the block and the inturned edges of the strip. The space between one inturned edge 10 and the block is desirably greater than the space between the other inturned edge 11 and the block.

As a next step in the method, the two-ply edge portion 7 of the asbestos fabric strip may be turned upward to place the single thickness portion 12 against the block or strip 9, with the two-ply portion 7 extending above the block. A strip 13 of filler material such as braided asbestos stock may then be placed upon the upper face of the block against the inner ply 14 of the two-ply portion 7. A vulcanizable, heat-resistant, adhesive rubber compound of the type already described may be used as an adhesive for joining the filler material to the block. The filler material need not be braided stock, but could be a folded cloth. For high temperature service, the filler material should be heat-resistant, asbestos in some form being especially suitable. The braided asbestos is easy to utilize and gives excellent results and hence is preferred. The filler material should be covered with a rubber adhesive, exemplified at 15, of the type heretofore mentioned to hold the material together not only in the preform stage but in the final vulcanized product. The filler strip 13 may advantageously be made narrower in width than the underlying block 9, and may be placed at one edge of the block, with its one vertical edge 16 offset slightly inwardly from the corresponding vertical edge 17 of the block to such an extent as to accommodate the thickness of the inner ply 14 of the two-ply portion 7 and produce a substantially vertical, unstepped outer face on the cover at that side of the gasket. The other vertical edge 18 of the filler strip 13 is offset inwardly to a greater extent from the other vertical edge 19 of the block 9, for a purpose which will be hereinafter explained. The two-ply edge 8 may then be turned up to bring the single thickness portion 20 against the vertical edge 19 of the block 9 and also against the exposed top edge 21 and surface 22 of the block, the two-ply portion 8 being pressed against the vertical edge or side 18 of the filler strip 13. The fold lines of the double thickness portions 7 and 8 extend slightly above the top of the filler strip, for a purpose which will be explained later. The order of the cover folding steps and placement of the filler material of the core strip can obviously be varied in arriving at a preform such as described. This preform is preferably calendered or hammered to eliminate air pockets and obtain a good adhesion between the fabric strip and the block or core material and the filler strip. The resulting preform, illustrated generally at 50 in Fig. 3, is vulcanized under heat and pressure in a channel mold of the proper size and configuration.

Figure 3:
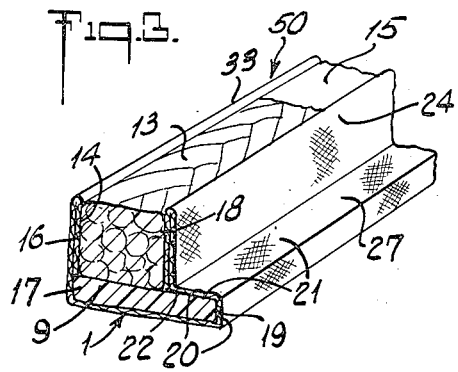
Fig. 3 is a perspective view, partly in section, of a gasket preform, showing a strip of braided asbestos superposed on the strip of vulcanizable compound, and the lateral edges of the gasket cover folded against the strip of compound and the braided asbestos strip.
Figure 4:
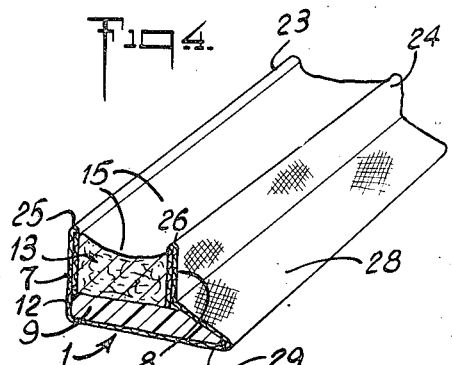
Fig. 4 is a view similar to Fig. 3, but showing the gasket in final form after vulcanization under heat and pressure in a mold.

By reference to Figs. 3 and 4, the purpose of offsetting the filler strip from one edge of the core block, as well as the use and extension of the double-thickness portions of the fabric strip against and above the filler strip will become apparent. In the molding and vulcanization process, the portions 23 and 24 at the fold lines of the two-ply sections of the fabric strip that extend above the filler strip 13 assume a peaked or tapered configuration as illustrated at 25 and 26 in Fig. 4. These portions serve as sealing lips on the finished gasket, which has an overall configuration as shown in Fig. 4. It will be apparent that the lateral protrusion or step 27 formed at the base of the gasket strip as a result of the extension of the block 9 beyond the edge of the filler strip 13 assumes, in the final gasket, a tapered shape as shown at 28 in Fig. 4. The protrusion 28 also forms a sealing lip. In a typical application, the lips 25 and 26 fit into a channel portion around the door of a steam autoclave, these lips sealing against the escape of steam. The application is such that the door of the autoclave shuts against the surface 29 of the sealing lip 28.

The folding of the edges of the fabric strip 1 to form the double-thickness portions 7 and 8 serves an additional function in the construction described, in that the free ends or edges 10 and 11 of the strip lie at the base of the gasket rather than at any of the sealing surfaces, with the result that the cover is securely anchored in service and cannot be readily delaminated. As previously pointed out, a major fault in laminated gaskets of this general type has been the tendency for delamination to start at the sealing faces. This appears to have resulted in part from the construction of such gaskets with at least one edge of the cover falling at a sealing surface or lip. It will be seen that in my construction this deficiency is avoided.

A strip gasket made as described above has the properties and advantages specified as desired in the statement of objects. The use of elastomers of the type described in the vulcanizable heat-resistant compound from which the block 9 is formed, as a coating for the fabric strip 1, and as an adhesive for joining the several portions of the gasket contributes improved resilience and sealing properties to the gasket as a whole. The block 9 in itself actually serves additionally as a cushion, enhancing the resilience of the gasket considerably. By covering the block with the asbestos fabric strip 1, and filler strip 13, it is protected from high temperatures and physical mutilation and thus retains its resilience longer, thereby prolonging the effective life of the gasket. The asbestos fabric cover 1, particularly where used with wire insertion, adds strength to the finished gasket and prevents delamination, as well as providing all of the sealing surfaces or lips in the simple manner described above. The treated asbestos fabric 1, when vulcanized, retains its resilience but is tough and heat-resistant. It is also resistant to the action of many solvents and gases, as well as having utility as a seal against water, or in a variety of other general applications.

While I have described above a preferred method of making a particular gasket that satisfies the stated objects of my invention, I do not consider my invention as limited by the specific illustration given, as various alternative and equivalent features will readily suggest themselves to one skilled in the art. For instance, the portions of extra thickness forming the sealing lips 25 and 26 could be formed in other ways, as by employing a rolled strip of the treated fabric cover material on the inside of the cover along the lines on which the lips are to be formed, or in other suitable fashion. The ends or edges of the cover could also be anchored at the base of the gasket or some portion remote from the sealing surfaces or lips in a manner other than that specifically illustrated. The gasket can be given any desired cross-sectional shape, as by locating the filler strip centrally upon the core block or strip, rather than in the offset manner shown. In whatever form the gasket is made, however, it is important in obtaining the advantages sought to include a resilient core block or strip of the type described and is highly preferable to anchor the edges of the cover at points remote from the sealing surfaces so as to prevent delamination. As a corollary to this, it follows that the sealing surfaces and lips should be provided by a cover material of the type described, but preferably should not include the free edges of the cover. The use of the extra thickness portions of this cover material as sealing lips provides an extra toughness and resilience and long life in the lips. The filler strip, in combination with the core strip and cover described, adds body to the gasket and protects the core strip, thus prolonging its resilience and that of the gasket as a whole.

Figure 5:
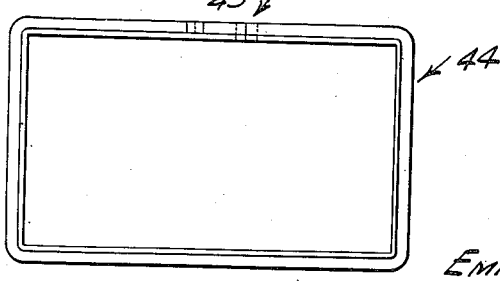

I have further devised a simple and effective method, illustrated in Figs. 7-9, of joining the ends of my novel strip gasket in order to make an endless gasket, shown generally at 44 in Fig. 5, wherein the joint is illustrated at 45, as required in many applications. It is difficult to achieve an effective permanent leak-proof joint between the ends of a vulcanized gasket of the type described. By my method, I obtain such a permanent leak-proof joint. In the practice of this method, the ends 30 and 31 of the vulcanized strip gasket are under-cut as shown at 32 and 33 and bevelled off longitudinally from the tip edges adjacent the under-cut portions as shown at 34 and 35, while the bases 36 and 37 of the under-cut portions are diagonally cut to receive the bevelled tips in complemental relationship. The bottom and top areas 38 and 39 of the ends of the strip adjacent the lines on which the joint is to be formed are cleaned and buffed and coated with a splicing cement, which is preferably an adhesive compound of the type employed in the fashioning of the strip gasket proper. The splicing cement is also applied to the cut edges. A sheet 40 of one of the compounds employed for the core strip 9, cover coating 5, etc. in the strip gasket, as described above, is then applied preferably to all of the cut and bevelled edges or surfaces of one of the ends 30 or 31. This sheet may preferably be a sheet of "neoprene" compound about 1/32" thick. A suitable splicing cement, which may be the type applied to the buffed areas and to the cut edges, is then applied to the exposed surfaces of the sheet of "neoprene" or other compound. The ends 30 and 31 are then brought together in complemental relation as shown in Fig. 8. Pieces 41 and 42 of "nylon" cloth, suitably about 2" in width are coated with splicing cement, which suitably is of the type mentioned before, and applied respectively over the areas 38 and 39 and the joint lines between them, as shown in Figs. 8 and 9, the nylon cloth being shaped into and against the trough-like portion 43 formed between the lips 25 and 26. The spliced joint is then vulcanized in a mold of suitable size and corresponding configuration. Spacers may desirably be inserted between the top and bottom sections of the mold to localize the mold pressure to a large extent to the region of the spliced joint.

The resulting joint is strong, permanent, and leak-proof. The main purpose of the "nylon" cloth at the joint is to insure against the popping apart of the overlapped ends of the gasket in handling and shipping. While "nylon" is preferred, cotton or glass or any other fabric that would withstand the heat of vulcanization at the joint would be effective to provide the advantages sought. The ends of the strip may be cut to other configurations than those illustrated to provide a lapped and/or interlocking fit at the joint, but that shown is preferred as particularly effective in preventing the ends from separating from each other in service or from each other in a direction normal to the top and bottom surfaces of the gasket in handling or shipment.

From the above detailed description, it will be evident that I have attained the objects of my invention. Having thus described my invention in rather full detail, it will be understood that these details need not be strictly adhered to but that various changes and modifications may suggest themselves to one skilled in the art, all falling within the scope of the invention as defined by the subjoined claims.

What I claim is:

1. A gasket comprising, a core strip of resilient rubber compound having top, bottom, and side surfaces, a filler strip having top, bottom, and side surfaces, said filler strip being coated with a rubber joined at its bottom surface to the top surface of said core strip, and a fabric cover strip having thereon a tough, resilient rubber coating, said coated fabric cover strip being joined to the bottom and side surfaces of said core strip and to the side surfaces of the filler strip and having laterally spaced upper edge portions in the form of longitudinally extending ridges protruding beyond the top surface of the filler strip to serve as sealing lips.

2. A gasket as defined in claim 1, in which the upper edge portions of the cover protruding beyond the top surface of the filler strip comprise extra-thickness portions of the cover material.

3. A gasket as defined in claim 2, in which said extra-thickness portions comprise folds in the cover material, the free edges of the cover strip being turned inwardly to form the folds and being anchored to the filler strip.

4. A gasket as defined in claim 1, in which the filler strip comprises braided asbestos stock and the fabric of the cover strip is a wire-reinforced asbestos fabric.

5. A gasket as defined in claim 1, in which the core strip and cover strip extend laterally beyond at least one side of the filler strip to form a protrusion providing an additional sealing lip.

References Cited in the file of this patent

UNITED STATES PATENTS

| | | |
|---|---|---|
| 647,194 | Mason | Apr. 10, 1900 |
| 843,630 | Restein | Feb. 12, 1907 |
| 875,574 | Garlock | Dec. 31, 1907 |
| 1,086,240 | Strong | Feb. 3, 1914 |
| 1,108,021 | Taylor | Aug. 18, 1914 |
| 1,168,807 | Hill | Jan. 18, 1916 |
| 1,207,853 | Burrell | Dec. 12, 1916 |
| 1,400,539 | Gates | Dec. 20, 1921 |
| 1,466,086 | Christenson | Aug. 28, 1923 |
| 1,533,490 | Wirfs | Apr. 14, 1925 |
| 1,648,391 | Farrington | Nov. 8, 1927 |
| 1,756,355 | Henderson | Apr. 29, 1930 |
| 2,391,731 | Miller et al. | Dec. 25, 1945 |
| 2,439,043 | Evans | Apr. 6, 1948 |
| 2,606,598 | Smith | Aug. 12, 1952 |

FOREIGN PATENTS

| | | |
|---|---|---|
| 1,838 | Great Britain | of 1882 |